Figure 3:
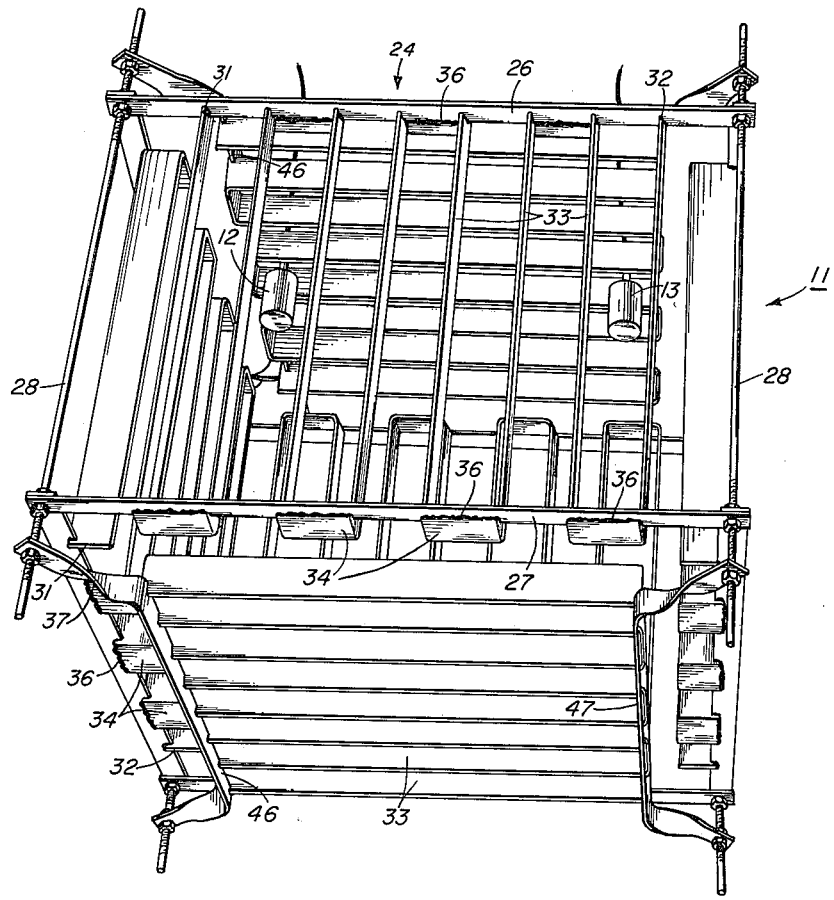

April 23, 1963
W. J. TOULIS
3,087,138
APPARATUS FOR MEASURING SOUND SPEED AND ATTENUATION
CHARACTERISTICS IN LIQUID MEDIA
Filed June 28, 1960
4 Sheets-Sheet 1
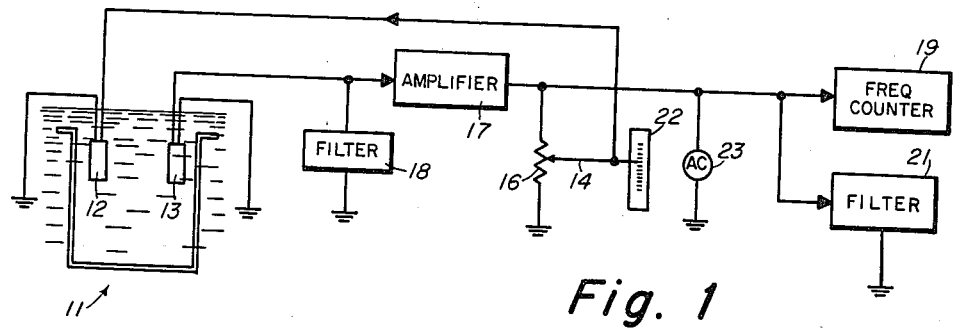
Fig. 1
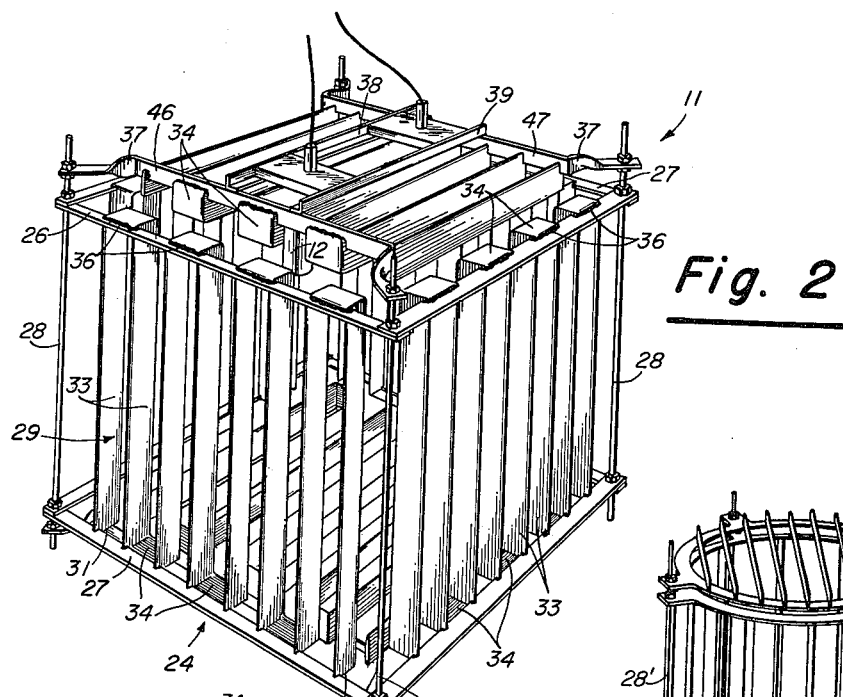
Fig. 2
Fig. 11
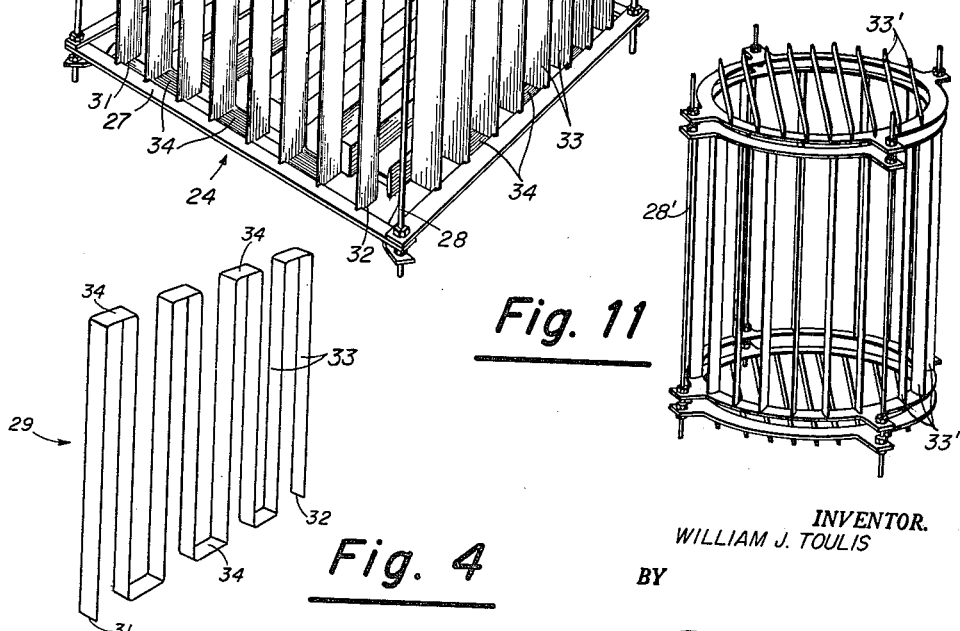
Fig. 4
INVENTOR.
WILLIAM J. TOULIS
BY
ATTORNEYS April 23, 1963 W. J. TOULIS 3,087,138
APPARATUS FOR MEASURING SOUND SPEED AND ATTENUATION
CHARACTERISTICS IN LIQUID MEDIA
Filed June 28, 1960 4 Sheets-Sheet 3

INVENTOR.
WILLIAM J. TOULIS
BY

ATTORNEYS

REFLECTION PROPERTIES OF COMPLIANT TUBING

INVENTOR.
WILLIAM J. TOULIS

United States Patent Office 3,087,138
Patented Apr. 23, 1963

3,087,138
APPARATUS FOR MEASURING SOUND SPEED AND ATTENUATION CHARACTERISTICS IN LIQUID MEDIA
William J. Toulis, 727 Stafford Place, San Diego, Calif.
Filed June 28, 1960, Ser. No. 39,410
22 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 595,563, filed July 2, 1956, entitled "Apparatus for Controlling the Effective Compressibility of a Liquid" and issued on February 13, 1962 under Patent No. 3,021,504.

The present invention relates to an apparatus for measuring the speed of sound and attenuation constant therefor for given liquid media and, more particularly, to such apparatus utilizing a free-flooding, sound-reverberant chamber with pressure-release walls.

According to the invention, a free-flooding, high-Q, sound-reverberant chamber, operable at sonic and supersonic levels, and adapted to be submerged in a liquid whose sound speed and attenuation characteristics are to be tested, provides an acoustic-transmission-link between a pair of transducers located within the chamber and separately connected to an external electronic system. One of the transducers serves as an acoustically-actuated transducer to originate an electrical signal which is amplified at constant gain. This amplified signal is fed to a frequency counter, the indicated frequency serving as a measure of the speed of sound propagation in the liquid within the chamber. A variable-strength regenerative-feedback signal is fed from the output of the amplifier to the other transducer which is electrically-actuated to originate the acoustic propagation within the sound-reverberant chamber; the strength of this feedback signal is varied as necessary to maintain the amplifier output signal at its maximum value as indicated on an appropriate A.C. voltmeter. The strength of this required feedback signal, as shown on a suitable indicator, is a measure of the degree of sound propagation attenuation taking place within the liquid within the chamber. The sound-reverberant chamber is the frequency-determining element of the propagation wave in the entire system just described and operates as a resonator.

Crucial to the present invention is the nature of its free-flooding, high Q, sonic-and-supersonic-frequency operable sound-reberberant chamber with its pressure-release or "soft" walls.

In a gaseous medium, like air, rigid walls have been used in the formation of reverberant chambers, but in liquid media the attempt to use rigid walls in a sound-reverberant chamber or resonator presents certain practical difficulties. Rigid walls, when used in liquid media, in order to present sufficient impedance discontinuity for yielding a satisfactory Q for the chamber, must be comparable in thickness to one-fourth the wavelength of sound in the wall material. Except at very high frequencies where the wall thickness can easily be made comparable to the wavelength of sound, this dimensional requirement necessitates an impracticably large and heavy chamber. Even where high frequencies are employed, making the size and weight of the chamber within feasible limits, the acoustical Q of the rigid-wall chamber is high only when multiple vibrational modes exist in the chamber; the Q of such a chamber is low in the lowest mode of resonance and comparable to the ratio of the characteristic impedances of the wall material to the enclosed or enveloping liquid.

The present invention utilizes a sound-reverberant chamber characterized by "pressure-release" walls which are individually of open framework-like structure. A result of the discontinuity or openness of the wall structure of the chamber is that the chamber is "free-flooding" being practically open to the flow of liquid medium in which it is submerged for the testing of sound speed and sound attenuation characteristics of the liquid within the chamber. The discontinuous, open, skeletal-like wall structure comprises spaced compliant elements which functionally unite to present, to acoustic waves within the chamber, sound barriers which are equivalent in effect to pressure-release surfaces and which yield a much greater impedance discontinuity at the wall boundaries than is effectuated by the use of the previously-noted continuous, rigid solid-walls. Since the acoustical Q of the chamber is a measure of the impedance discontinuity achieved at the wall boundaries of the afore-described spaced-structure, pressure-release walls produce, for use in liquid media, a sound-reverberant chamber of extremely high acoustical Q, much higher than that attainable with the rigid, solid wall structure. Moreover, this spaced-structure soft-walled chamber is not restricted for practical use to high frequencies, as is the rigid solid-walled chamber, with the result that for the first time its use brings into being a high Q chamber operable at sonic frequencies in liquids, including even flowing plastics. This attainment of a very high Q permits high precision in the measurement of the acoustic properties (i.e. sound propagation speed and attenuation) of the liquid medium within the chamber. An acceptable Q for the purpose at hand with a solid, rigid-wall chamber, as previously has been noted, is obtainable only when multiple vibrational modes exist in the rigid-wall chamber, but the soft-walled chamber of this inveniton produces an eminently satisfactory Q at the lowest vibrational mode to further even more the degree of measurement precision in determining the acoustic properties of the medium under test.

There are other advantages derived from this chamber structure. Since the chamber walls act like pressure-release surfaces the sound pressure field within the chamber is such that the pressure at the chamber walls approaches zero, unlike the solid-wall chamber where the pressure at the chamber walls is a maximum finite value. In any such chamber submerged in a liquid medium for measuring the acoustic properties of the medium there will be an accumulative attachment of foreign matter to the chamber walls. With the rigid-wall chamber where there is a substantial sound pressure at the wall boundaries these foreign attachments cause undesirable perturbation and may affect so seriously the reliability of the acoustic properties' measurements taken with the chamber as to render the apparatus ineffective for this purpose. With the compliant wall structure of the present chamber this foreign matter accumulation, since it falls along nodal points in the sound pressure field in the chamber, does not introduce the difficulty described. Not the least important of the advantages derived from the compliant-element, spaced discontinuous wall structure are the very light weight and small dimensions of the chamber and its free-flooding feature which, among other benefits, cause minimal drag when the chamber is drawn through a liquid medium, such as would occur for example, in the testing of sea samples.

An object of the present invention is the provision of an apparatus for measuring acoustic properties of liquid media.

Another object is the provision of an apparatus for measuring the speed of sound in a given liquid medium.

Still another object is the provision of an apparatus for measuring the attenuation characteristic of sound in a given liquid medium.

A further object is to provide a very-high-Q sound-reverberant chamber for use with liquid media.

Still another object is the provision, for use with liquid media, of a high-Q sound reverberant chamber operable at sonic frequencies.

A further object is to provide, for use with liquid media, a high-Q sound-reverberant chamber operable at both sonic and ultrasonic frequencies.

An additional object is to provide a sound-reverberant chamber having free-flooding characteristics for use in liquid media.

A further object is to provide a very-high-Q, free-flooding sound-reverberant chamber for use with liquid media.

Still another object is to provide a high-Q sound-reverberant chamber which is compact and light in weight for use in liquid media.

Another object is to provide, for use with liquid media, a high-Q sound-reverberant chamber whose reliability is relatively unaffected by the attachment of foreign matter to the chamber walls.

Still another object is to provide, for use with liquid media, a high-Q sound reverberant chamber operable at the lowest vibrational mode as well as at higher modes.

Another object is to provide a sound-reverberant chamber having pressure-release-wall characteristics.

Still another object is to provide, for use with liquid media, a sound-reverberant chamber operable at both sonic and ultrasonic frequencies.

An additional object is to provide a pressure-release resonator for use with liquid media.

A further object is to provide, for use with liquid media, a pressure-release resonator operable at both sonic and ultrasonic frequencies.

Figure 5:
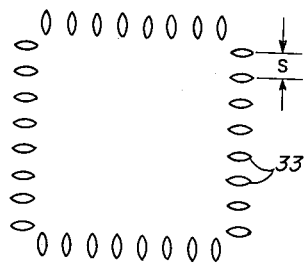
Figure 6:
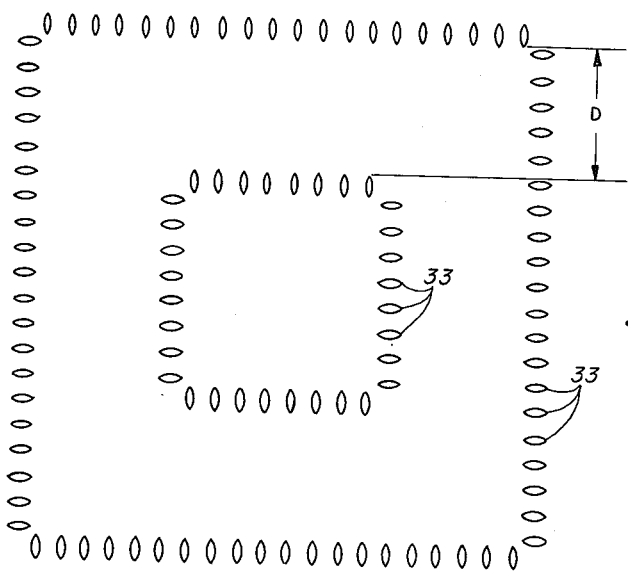
Figure 7:
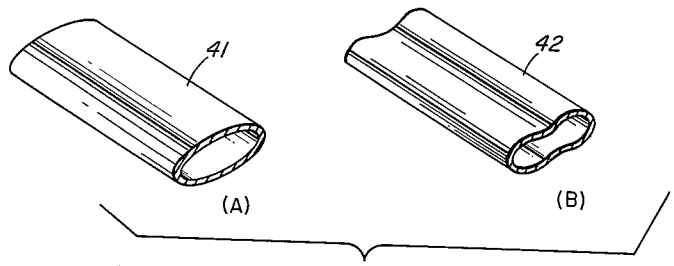
Figure 8:
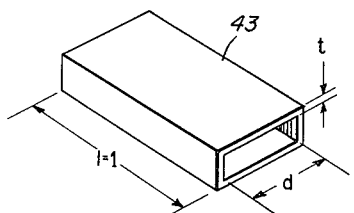
Figure 9:
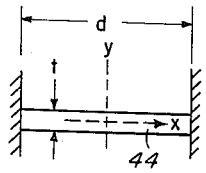
Figure 10:
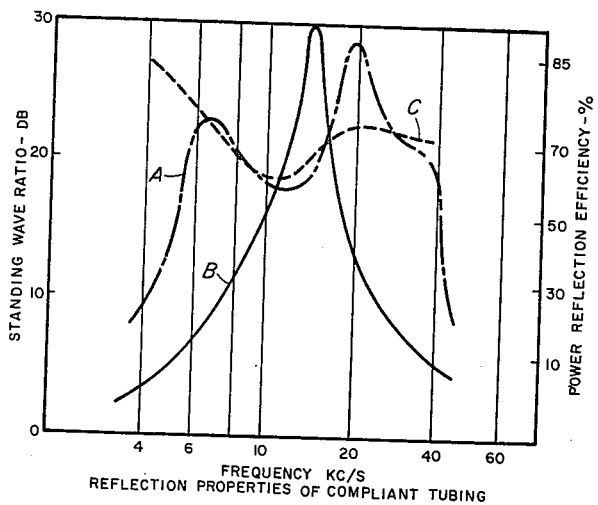

Other objects and many of the attendant advantages of this invention readily will be appreciated as the same becomes better understood by reference to the following detailed description when considered in conjunction with the accompanying drawing in which like reference numerals designate like parts throughout the figures thereof and wherein:

FIG. 1 shows a schematic view of the apparatus for measuring the propagation constants of various liquid media, FIGS. 2 and 3 are perspective views of an embodiment of the sound-reverberant chamber complete with transducers, FIG. 4 shows compliant tubing section 29, FIG. 5 is a diagrammatic showing of a section view taken through the compliant elements of the vertical walls of the sound reverberant chamber embodiment portrayed in FIGS. 2 and 3, FIG. 6 is a similar section-view for such a chamber having double-layer walls, FIG. 7 is a perspective view of several typical compliant tube shapes, FIG. 8 is a rectangular tube mathematical equivalent of the compliant tube of FIG. 7 as depicted by 7(a) or 7(b), FIG. 9 is a clamped beam mathematical equivalent of the compliant tube of FIG. 7 as depicted by 7(a) or 7(b), FIG. 10 is a graph of reflection characteristics of planar arrays of compliant tubes; and FIG. 11 is a perspective view of a cylindrically-shaped embodiment of the compliant tube, pressure-release wall chamber.

FIG. 1 shows the entire apparatus, in schematic form, which is used to measure the sound speed and propagation attenuation characteristics of the liquid medium, such as sea water for example, in which the free-flooding sound reverberant chamber 11 with its transducers 12 and 13 is submerged to encompass a specimen volume of the liquid medium. The system is initially self-excited depending on the presence of an ambient signal for its initial energization. A regenerative feed-back signal, whose strength is determined by the mating position of sliding contact 14 with resistor 16, is fed from the output side of amplifier 17 through sound-reverberant chamber 11, via acoustic-output transducer 12 and electrical-output transducer 13, and then through filter 18 to the input side of amplifier 17. Electrically-actuated transducer 12 and acoustically-actuated transducer 13 are acoustically linked by the sound propagation taking place in the liquid-specimen-encompassing sound-reverberant chamber 11. The frequency of the electrical signal transmitted to the electrical portion of the system by electrical-output transducer 13 and back to the acoustic-output transducer 12 is determined by the natural frequency of vibration of the system comprising the structure of chamber 11 and the liquid specimen encompassed by said chamber which operates at resonance within the entire apparatus. The amplified output signal coming from amplifier 17 is fed to frequency counter 19. Since the frequency of this amplified signal is determined by the character of the acoustic propagation within the liquid-specimen-encompassing sound-reverberant chamber 11 the frequency count shown by frequency counter 19 when the chamber 11 is submerged in any given liquid is a measure of the speed of sound propagation in the specimen of the particular liquid which is encompassed by the free-flooding chamber 11. The output signal from amplifier 17 is also fed to a filter 21. For various liquid specimens within chamber 11 the mating position of sliding contact 14 with resistor 16 is shifted as necessary to keep amplifier 17 output signal strength, as indicated by A.C. voltmeter 23, at its maximum. The particular mating position of sliding contact 14 and resistor 16 which is required for maintaining this output signal from amplifier 17 at the constant maximum value indicates the strength of the regenerative-feedback signal necessary for this purpose. The strength of the required regenerative-feedback signal, as indicated by the position of mating of sliding contact 14 and resistor 16, is a measure of the sound attenuation characteristic of the liquid specimen within the chamber 11 and is easily readable on an indicator 22 linked to sliding contact 14. With the output signal from amplifier 17 maintained at constant strength, amplifier 17 operates under a constant gain condition. Filters 18 and 21 are not absolutely necessary to the operation of the system, but are refinements thereto. In operation, filters 18 and 21 function to accomplish several desirable objectives. Such a sound-reverberant chamber 12 as defined herein will have multiple modes of resonant vibration. It will be apparent that it is desirable to restrict the operation of the entire system herein employing this chamber 12 to a selected one of these multiple modes of resonant frequency. Filters 18 and 21 operate cooperatively to filter out unwanted modes of resonant vibration and additionally operate to set up proper phase relationships for optimum oscillation in the chamber. For this optimum oscillation within the sound reverberant chamber 12, it can be seen that there must be, with a certain range, a particular relative phase relationship between the signal originated in the chamber and the signal fed back to the chamber through the feedback line. It can be seen that filter 18 will provide the necessary phase control over the signal issuing from the chamber 11 and that filter 21 will do the same for the output signal which is fed back through the feedback line to transducer 12. Under normal conditions the filters 18 and 21 are tuned for resonance at a frequency in the middle portion of the band of operational frequencies. The transducers 12 and 13 and amplifier 17 themselves may introduce, into the overall apparatus, phase shifts of their own which likewise will be compensated for by filters 18 and 21. Use of filters or phase shifting networks for this purpose of providing adjustable phase control as defined herein is routine within this art.

FIGS. 2 and 3 illustrate in perspective the structure of one embodiment of free-flooding, pressure-release-walled sound-reverberant chamber 11 with the transducers 12 and 13 mounted therein. Chamber 11 consists of acoustically-operative structure in each of the chamber walls and structural frame members for supporting the acoustically-operative structure of each wall and for linking together the various walls to form the chamber. Considering wall 24 which is representative of the vertical walls of the chamber, two horizontal frame members 26 and 27 are linked at their outermost ends with similar frame members of adjoining walls through their union with common tie-rods 28. Mounted onto the chamber-interior sides of horizontal frame members 26 and 27 and bonded thereto by adhesive epoxy resin is a square-wave-shaped "compliant tubing" section 29, which is sealed at its ends 31 and 32. The vertically extending portions of the compliant tubing section 29 are equally spaced from adjacent like-members and comprise the acoustically-operative portions of the wall and will hereafter be referred to as the "compliant elements" 33. These compliant elements 33 need not have been formed as portions of an integral member, as shown here, but may be constructed as separate, individual structures. The nature of and requirements to be satisfied by these compliant elements of the chamber walls will be defined, later, at length. In the particular embodiment shown in FIGS. 2 and 3 using the one-section of square-waveform the horizontal peaks of the waveform structure such as seen at 34, for example, are bonded throughout their length to the horizontal frame members 26 and 27 by previously-noted adhesive epoxy resin, shown for example at 36; the result is a very firm mounting of the compliant elements 33 to the supporting frame members 26 and 27. These horizontal portions of the square-waveform section 29 as shown at 34 are from an acoustic-function standpoint of no material significance, serving only to aid in the physical mounting of the acoustically-operative compliant elements 33. The acoustically-operative structure of top and bottom walls of the chamber is substantially identical to that of the representative vertical wall just described. It will be noted, however, from FIGS. 2 and 3 that the frame members 46 and 47 of the top and bottom walls of the chamber differ somewhat from similar frame members for the side walls and are twisted and angled, as shown at 37, so as to unite with the same vertically-extending tie-rods 28 which join the frame members of the individual side walls; this tie-rod union enables the weight loads of the respective top and bottom walls to be sustained by the tie-rods rather than imposed on the vertical walls where these loads could be objectionable.

Dependently mounted from a pair of supporting members 38 and 39, which themselves are transversely mounted across the top wall frame members 26 and 27, are the previously described transducers 12 and 13, which are respectively acoustic-output and electrical-output transducers.

The pressure-release walls of the "soft-walled" sound-reverberant chamber 11 are defined by the six "planar" arrays of compliant elements 33. In each wall the inner edges of the series of parallel compliant elements 33 define a plane. These planes of the various walls unite to define the internal or "operative" volume of the chamber; it is the liquid medium within this operative volume which is being tested at any given instant of time.

The preferred embodiment for compliant elements 33 and that shown by the drawing are "compliant tubes." These compliant tubes are thin-walled, resilient tubes which have been deformed or partially flattened so that the resulting cross section of the tubes varies from the circular cross-section which the tubes have when originally procured from commercial sources; the resulting cross section configurations are usually elliptical or figure-eights. In the drawing elliptical cross sections generally are shown. Except from a convenience-of-mounting stand-point the particular orientation of the elliptical-cross-section (or like deformed) compliant tubes is of no particular significance. The spacing from compliant tube to compliant tube, or of any suitable compliant element series, in a given wall is, however, of significance and is preset in the construction of the chamber. The significance of this compliant element-to-compliant element spacing in the individual wall structures will be dealt with at length in a later portion of the specification. It is the spacing from one another of compliant elements 33 that gives chamber 11 its free-flooding characteristic.

The purpose of the tube deformation is to give each tube a substantial degree of compliance or compressibility. Tubing circular in cross-section could be used but tubes with such cross section have a rigidity too great to afford the required compressibility unless they are extremely thin and therefore impracticable from a commercial standpoint. Each compliant tube which constitutes a compliant element 33 must be sealed off from the fluid medium which is being tested. Where individual compliant tubes are used for the compliant elements 33 each tube must be sealed at its ends. Use of the one-piece square-wave-shaped compliant tubing section 29 (shown separately in FIG. 4), for forming the row of multiple compliant elements 33 (which makes up the acoustically-operative structure of each wall) requires sealing only at the ends of the section 29 at 31 and 32. The sealed compliant tubes (or tubing section) generally will be filled with any fluid which has a greater compressibility than the outside, to-be-tested medium or the tubes (or tubing section) may be left evacuated. Thus the compliant tubes (or tubing section) may contain air or some other gas or a liquid having greater compressibility than the "outside" liquid medium or be vacuum sealed. As a practical matter filling the compliant tubes (or compliant tubing section) with air at atmospheric pressure is most convenient.

The compliant tubes (or compliant tubing section) are distinguished by a compressibility of constant value at low frequency ranges, a compressibility which essentially is independent of changes in static pressure from the external or test liquid, such as would be encountered, for example, in testing sea samples at various depths, so long as the elastic limit of the material of the tubes (or tubing section) is not exceeded.

Exemplary of suitable compliant tube material is a thin-walled metallic tube 6061–T6, ⅜ of an inch outside diameter and of .028 inch wall thickness, which is partially flattened to form a "compliant tube." The ends of the tube may be sealed by soldering or welding or the like. Joinder of tubes to frame members may also be done by welding or the like.

The compliance or compressibility of the "compliant tube" hinges principally upon the resilience of the deformed tube wall. In order to obtain the benefit of such resilience it is necessary that there be a difference in magnitude between the compressional wave energy or sound applied to the external surface of the tube than to the internal surface of the tube. This requirement precludes the use of free-flooding tubes, causing the employment of sealed tubes. The matter confined within the sealed tube is of relatively small importance so long as its compressibility is great enough to allow vibration of the tube walls.

The basic concept for forming the high Q sound reverberant chamber, described above, by construction of the chamber walls of compliant elements which form a discontinuous wall structure embraces the use of compliant elements other than the "compliant tubes" hereinbefore described. The general criterion which must be met by the compliant elements which form the acoustically-operative portions of the individual walls of the chamber is that the compressibility of the compliant elements be greater than the compressibility of a comparable volume of the test liquid. Within this broad requirement, materials must be excluded which introduce undersirable characteristics which would negative their utility as "compliant elements." For example, rubber tubes though meeting the broad requirement are generally unsuitable. The Q attained with them has not been very high. Though sufficiently compressible they present viscous surfaces and have a shifting compressibility. The introduction of viscosity is particularly a potential problem when attempt is made to use solid compressible strips as "compliant elements." Foam rubber "compliant elements," in addition, would introduce considerable absorption of sound energy with resulting undesirable attenuation of the sound energy within a reverberant chamber made thereof.

Compliant tubing has a resonance characteristic determined by its dimensions and its mechanical properties. The mathematical equivalent of typical individual compliant tubes 41 and 42 as seen in FIGS. 7(a) and (b), respectively, may be represented as a rectangular tube 43 as seen in FIG. 8 or, more simply, as a clamped beam 44 as seen in FIG. 9. The latter configuration has been studied extensively in both static and dynamic structures and therefore its properties have been established fairly well. In terms of the clamped-beam equivalent seen in FIG. 9 the lowest resonant frequency $f_r$ may be expressed in a form which includes the radiation loading of the enveloping medium as:

$$f_r = 1.028 \frac{t}{d^2} \sqrt{\frac{E}{\rho e}}$$

where $t$ = wall thickness of tube or strip;
$d$ = inside width of compliant tube or strip;
$E$ = Young's modulus of tube material;
$\rho e = (1+\beta)$ is the effective density of the bar or strip and takes into consideration the reactive loading of the enveloping medium;
$\rho$ = density of the tube material;

$$\beta = \frac{3}{4}(\frac{1}{2})\frac{\rho_0}{\rho}\frac{d}{t}$$

and $\rho_0$ = density of the fluid medium.

The high Q, soft-walled, free-flooding sound-reverberant chamber 11, with its encompassed liquid specimen operates with resonance vibrational response. The "soft-wall" chamber 11 and its included liquid specimen comprise a system which has a composite resonance characteristic that may be analyzed as the combination of the resonance response characteristics of the "compliant elements" (in the preferred embodiment, the "compliant tubes") and the resonance characteristic of the volume of the particular liquid specimen within the chamber at any particular time of testing. The specimen volume involved is that in the preferred embodiment formed by six planes, each plane being defined by the inner portions of the row of compliant elements 33 which make up the acoustic structure of an individual chamber wall. A strength-of-vibration response vs. frequency graph of the compliant tube structure reveals a relatively broad, flat-peaked resonance response whereas similar portrayal of the same characteristics of the specimen volume within the chamber reveals a relatively sharp, narrow-peaked resonance response. The chamber 11 is constructed to accomplish superposition of the "volume" resonance curve somewhere along the broad peak of the "compliant tube" resonance curve, thus insuring a combined system whose naturally-sought frequency yields a high degree of vibration strength.

The structure of chamber 11 is also keyed to the requirement that the walls of the chamber yield a high degree of sound reflection efficiency.

The reflective characteristics of a single layer of compliant tubes are not unlike those of a uniform sheet of material, with a velocity of sound $c_n$, immersed in a fluid with velocity $c$. The ratio of the two velocities $$\frac{c}{c_n}$$

will be defined as the index of refraction $n$. The reflection coefficient of such a sheet of thickness $l$ may be calculated by analogy with electrical transmission line theory. Utilizing Equation 62, page 186, of Terman's Radio Engineer's Handbook, First Edition, and assuming that (a) the densities of the two media are the same, (b) the $\rho c$ of the fluid is the load terminating the transmission line and (c) the characteristic impedance of the latter is $\rho c/n$, it may be shown that frequencies where the sheet thickness $l$ is small compared to the wavelength $\lambda$ of sound in the fluid that the amplitude reflection coefficient, R may be expressed as:

$$R \cong \pi/\lambda(n^2-1)l$$

FIG. 5 is a diagrammatic showing of a section view taken through the elliptical-cross-section compliant elements of the vertical walls of the sound-reverberant chamber embodiment portrayed in FIGS. 2 and 3. It has been found that a very satisfactory sound reflection efficiency is achieved within the chamber when the center-to-center spacing S of adjacent compliant tube elements are roughly within the range of $\lambda/10$ to $\lambda/20$, $\lambda$ being the wavelength of sound for the particular frequency selected by the chamber as its "operating frequency."

The $\lambda/10$ and $\lambda/20$ limits though defining a very satisfactory operating frequency range as relates to the sound reflection requirement are not critical, sharply-defined limits such that a wavelength just outside these limits would not in some instances be satisfactory. Selection of an optimum compliant tube-to-tube spacing for the chamber wall elements for the purposes of sound reflection would lead to selection of a spacing of roughly $\lambda/20$. FIG. 10 is a graphic representation of reflection characteristics of several differently-spaced compliant tube planar arrays A and B and a comparison portrayal of like characteristics of a sheet of ¼ inch thick air cell rubber C. The liquid environment for these tests was water. The A curve corresponds to spacing between adjacent compliant tubes of ¾ inches and B to like spacing of 1½ inches. In each instance the compliant tubes are uniformly spaced and oriented so that the edges of the elliptical tubing face the sound source. In these instances a plane sound wave was directed to be normally incident to the planar reflecting array of compliant tubes and likewise to a planar sheet of air cell rubber. The significant measurable quantity for determining reflection characteristics is the maximum to minimum sound pressure or the amplitude standing-wave ratio (ASWR) which is related to the amplitude reflection coefficient $r$, by the following formulation:

$$r = \frac{ASWR-1}{ASWR+1}$$

The power reflection efficiency is determined by the square of the amplitude reflection coefficient. It should be noted that the compliant tubing curves have upper frequency limits that correspond approximately to half wave length spacing between tubes. It has been found that the orientation of the partially flattened tube is not significant except at the higher frequencies, where the width of the tube (thickness of the array) is more nearly comparable to the wave length of the sound in water. The curves of FIG. 10 indicate that the single layer array is effectively a ¼ wave length thick at 14 kilocycles per second for the tube of tube spacing, $S=1½$ inches. For $S=¾$ inches, the quarter wave thickness occurs at 7 kilocycles per second. The reflection peak at about 19 kilocycles per second is characteristic of the compliant tube and the radiation load on it.

In certain instances where an unusual degree of reflectivity is sought sound-reverberant chamber 11 may be made of walls which comprise double layers of compliant elements as portrayed by FIG. 6 which shows a double-walled compliant tube chamber. In each wall the outer layer or array of compliant tubes is arranged behind the inboard layer and is spaced therefrom a distance D equal to one quarter wavelength for the anticipated "operating frequency." Use of even a third layer has been found to yield almost total reflection.

It can thus be seen that the high Q chamber 11 is constructed to operate within a frequency range to enable, at the same time, "resonance operation" of the chamber and its included specimen and a high degree of reflection of sound from the compliant-element walls of the chamber. It is the extremely high Q available with this "softwalled" chamber 11 coupled with the other intrinsic advantages derived from the free-flood, light-weight, compliant wall structure which enables the accurate and feasible sound speed and attenuation characteristics' measurements attainable with this invention.

Although the sound-reverberant chamber embodiment shown by FIGS. 2 and 3 portrays a generally cubically-shaped chamber, a variety of chamber shapes are applicable, such as for instance a cylindrically-shaped chamber as seen in FIG. 11.

It should be understood, of course, that the foregoing disclosure relates principally to a preferred embodiment and that it is intended to cover all changes and modifications which do not constitute a departure from the spirit and scope of the invention.

What is claimed is:

1. Apparatus for measuring sound speed and attenuation characteristics in liquid media comprising a high-Q, free-flooding sound-reverberant chamber having pressure-release walls, said chamber being adapted to be submerged in liquid media to surround a fixed volume of the liquid medium in which it is submerged, said fixed volume of liquid constituting the specimen under test at a particular moment, a first electroacoustic transducer, mounted within said chamber, for converting electrical energy to acoustical energy, a second electroacoustic transducer, mounted within said chamber and spaced from said first electroacoustic transducer, for converting acoustical energy to electrical energy, amplifying means connected to the output of said second transducer for amplifying the electrical signal originating from said second transducer, frequency-counting means connected to the output of said amplifying means for measuring the frequency of the electrical signal coming from the output of said amplifying means, the frequency count indicated by said frequency-counting means being a measure of the sound speed in the liquid specimen encompassed by said sound-reverberant chamber, electrical signal amplitude indicating means connected to the output of said amplifying means for indicating the strength of the signal coming from said amplifying means, variable-strength regenerative-feedback means connected from the output of said amplifying means to said first electroacoustic transducer for maintaining the strength of said amplifying means output signal at a fixed maximum value and indicating means associated with said variable-strength regenerative-feedback means for indicating the particular strength of the signal required to be fed to said first electroacoustic transducer by said regenerative-feedback means in order to maintain the strength of said amplifying means output signal at said fixed maximum value, the required strength of said regenerative-feedback means necessary for the stated purpose being a measure of the attenuation of sound in the particular liquid specimen encompassed by said sound-reverberant chamber.

2. Apparatus for measuring the sound attenuation characteristic in liquid media comprising a high-Q free-flooding sound-reverberant chamber with pressure-release walls, said chamber being adapted to be submerged in liquid media to encompass a fixed volume of the liquid medium in which it is submerged, said fixed volume of liquid constituting the specimen under test at the particular time, a first electroacoustic transducer, mounted within said chamber, for converting electrical energy to acoustical energy, a second electroacoustic transducer, mounted within said chamber and spaced from said first electroacoustic transducer for converting acoustical energy to electrical energy, amplifying means connected to the output of said second transducer for amplifying the electrical signal originating from said second transducer, electrical signal amplitude indicating means connected to the output of said amplifying means for indicating the strength of the signal coming from said amplifying means, variable-strength regenerative-feedback means connected from the output of said amplifying means to said first electroacoustic transducer for maintaining the strength of said amplifying means output signal at a fixed maximum value and indicating means associated with said variable-strength regenerative-feedback means for indicating the particular strength of the signal required to be fed to said first electroacoustic transducer by said regenerative-feedback means in order to maintain the strength of said amplifying means output signal at said fixed maximum value, the required strength of said regenerative-feedback means necessary for the stated purpose being a measure of the attenuation of sound in the particular liquid specimen encompassed by said sound-reverberant chamber.

3. The apparatus of claim 1 wherein said sound-reverberant chamber comprises a plurality of pressure-release walls and connecting means for linking together said walls to form said chamber, each of said walls comprising acoustically-operative structure and skeletal supporting means joined to said acoustically-operative structure for supporting same, the acoustically-operative structure of each pressure-release wall of said chamber comprising a plurality of compliant elements spaced from one another to yield a wall discontinuous in structure so as to be freely permeable to liquid, each of said compliant elements having a compressibility characteristic greater than that of the specimen liquid.

4. The apparatus of claim 3 wherein each of said compliant elements comprises a thin-walled compliant tube of non-circular cross section sealed off at both its ends so as to preclude entry into said tube of the liquid medium in which the chamber is submerged and matter filling said sealed-off tube, said matter having a greater compressibility than the liquid medium being tested.

5. The apparatus of claim 4 wherein said thin-walled tubes are metal.

6. The apparatus of claim 5 wherein said thin-walled metal tubes are substantially elliptical in cross-section.

7. The apparatus of claim 5 wherein said thin-walled metal tubes are substantially figure-eight in cross-section.

8. The apparatus of claim 6 wherein said matter filling said sealed-off metal tubes is a fluid.

9. The apparatus of claim 6 wherein said matter filling said sealed-off metal tubes is air.

10. The apparatus of claim 3 wherein each of said compliant elements comprises an evacuated thin-walled metal tube, substantially elliptical in cross-section, closed at both its ends to contact with the liquid medium being tested.

11. The apparatus of claim 5 wherein the center-to-center spacing of said compliant tubes ranges between about $\lambda/10$ and about $\lambda/20$, $\lambda$ being the wavelength of sound propagation within said chamber and being determined by the natural frequency of vibration of the system comprising the acoustically-operative wall structure of said sound reverberant chamber and the volume of liquid specimen encompassed by the walls of said chamber.

12. The apparatus of claim 5 wherein the center-to-center spacing of said compliant tubes is substantially $\lambda/20$, $\lambda$ being the wavelength of sound propagation within said chamber and being determined by the natural frequency of vibration of the system comprising the acoustically-operative wall structure of said sound reverberant chamber and the volume of liquid specimen encompassed by the walls of said chamber.

13. The apparatus of claim 1 wherein said sound-reverberant chamber comprises a plurality of pressure-release walls and connecting means for linking together said walls to form said chamber, each of said walls comprising acoustically operative structure and skeletal supporting means joined to said acoustically-operative structure for supporting same, the acoustically-operative structure of each pressure-release wall of said chamber comprising a plurality of spaced rows of spaced compliant elements, each of said rows being spaced from one another by a distance substantially λ/4, λ being the wavelength of sound propagation within said chamber and being determined by the natural frequency of vibration of the system comprising the acoustically-operative structure of the pressure-release walls of said chamber and the volume of liquid specimen encompassed by the walls of said chamber, and each of said compliant elements in each individual row of compliant elements having a center-to-center spacing ranging from about λ/10 to about λ/20.

14. The apparatus of claim 13 wherein each of said compliant elements comprises a thin-walled, compliant metal tube, said tube being deformed from an originally-circular cross-section and being sealed off at both its ends from contact with the liquid medium in which said chamber is submerged, and matter filling said sealed-off tube, said matter having a substantially greater compressibility characteristic than the liquid medium being tested.

15. The apparatus of claim 1 wherein said sound-reverberant chamber is substantially cubical in shape and comprises six walls and linking frame means, running substantially parallel to the side walls of said chamber and located outwardly off the four vertically-extending corners defined by the meeting of adjacent side walls, for linking together said six walls to form the chamber in such a manner that none of said walls places a weight load on any other of said walls.

16. The chamber of claim 15 wherein each of said walls comprises a row of acoustically-operative spaced compliant elements and a pair of skeletal supporting members running substantially transverse to each of said rows of compliant elements, one of said supporting member pair extending along the bottom portion of its row of compliant elements and the other of said supporting member pair extending along the top portion thereof and each of said supporting member pair being joined to each of the compliant elements in the row, the supporting member pairs of the individual walls being linked together by said linking frame means.

17. The apparatus of claim 1 further characterized by first filter means connected across the input of said amplifying means and second filter means connected across the output of said amplifying means, the function of both said first and said second filter means being to maintain signal phase relations which are favorable to optimum oscillation.

18. A high-Q resonant-operated free-flooding soft-walled sound reverberant chamber, adapted to be submerged in a given liquid medium to encompass a fixed volume of said liquid medium, comprising a plurality of pressure-release walls and connecting means for linking together said walls to form said chamber, each of said walls comprising acoustically-operative structure and skeletal supporting means joined to said acoustically-operative structure for supporting same, the acoustically-operative structure of each of said pressure-release walls comprising a plurality of compliant elements spaced from one another, each of said compliant elements having a compressibility characteristic greater than that of the liquid medium, the center-to-center spacing between adjacent compliant elements in each pressure-release wall being about λ/20, λ being the wavelength of sound propagation within said liquid-encompassing chamber and being determined by the natural frequency of vibration of the system comprising the acoustically-operative wall structure of said chamber and the volume of the particular liquid encompassed by the walls of said chamber.

19. The chamber of claim 18 wherein each of said compliant elements comprises a thin-walled metal tube substantially elliptical in cross section, said tube being sealed at both its ends to preclude entry into said tube of the liquid in which said chamber is submerged and matter filling said sealed-off tube, said matter having a compressibility characteristic greater than that of the liquid medium.

20. In a free-flooding pressure-release-walled sound reverberant chamber adapted to be submerged in a variety of liquid media to encompass a fixed volume of the particular liquid in which it is submerged and operable at both sonic and ultrasonic frequencies as a resonator, acoustically-operative chamber wall structure comprising a plurality of compliant elements spaced from one another, each of said compliant elements having a compressibility characteristic greater than that of any of the liquid media in which it may be submerged, the center-to-center spacing of adjacent compliant elements in each wall being a fixed distance which may vary from about λ/10 to about λ/20, λ being the wavelength of sound propagation within said chamber and being determined by the natural frequency of vibration of the system comprising the acoustically-operative wall structure of said chamber and the volume of the given liquid specimen encompassed by the walls of said chamber.

21. The apparatus of claim 20 wherein each compliant element comprises a thin-walled, metal tube having a non-circular cross-section and closed at both ends to prevent entry into said tube of the particular liquid in which the chamber is submerged and matter filling said closed tube, said matter having a compressibility greater than that of any of the liquid media in which said chamber may be submerged.

22. In a free-flooding pressure-release-walled sound-reverberant chamber, adapted to be submerged in a variety of liquid media to encompass a fixed volume of the particular liquid in which it is submerged and operable at both sonic and ultrasonic frequencies as a resonator, acoustically-operative structure comprising a cylindrically-shaped vertical wall and disk-shaped upper and lower walls located respectively above and below said vertical wall to form a cylindrical acoustic chamber, said vertical wall comprising an annular row of vertically-extending radially-oriented spaced parallel compliant elements each of which has a compressibility characteristic greater than that of the liquid in which the chamber is submerged, each of said compliant elements being annularly spaced from adjacent compliant elements within a range substantially from about λ/10 to about λ/20, λ being the wavelength of sound propagation within the chamber and being determined by the natural frequency of vibration of the system comprising the acoustically-operative structure of the chamber and the quantity of the particular liquid encompassed by the chamber, each of said disk-shaped walls comprising a planar array of said compliant elements parallel to one another and linearly spaced from adjacent compliant elements within a range of about λ/10 to about λ/20.

References Cited in the file of this patent

UNITED STATES PATENTS

| | | |
|---|---|---|
| 2,283,750 | Mikelson | May 19, 1942 |
| 2,978,899 | Kritz | Apr. 11, 1961 |